United States Patent [19]

Buzinski

[11] 4,441,696

[45] Apr. 10, 1984

[54] HELICAL COIL SPRING END FORMING

[75] Inventor: Robert W. Buzinski, Hebron, Ind.

[73] Assignee: Amsted Industries Incorporated, Chicago, Ill.

[21] Appl. No.: 279,863

[22] Filed: Jul. 2, 1981

Related U.S. Application Data

[63] Continuation-in-part of Ser. No. 100,017, Dec. 3, 1979, abandoned.

[51] Int. Cl.³ .............................................. B23K 7/10
[52] U.S. Cl. ......................................... 266/57; 266/62
[58] Field of Search ...................... 266/57, 65, 72, 73, 266/62, 54

[56] References Cited

U.S. PATENT DOCUMENTS

| 2,035,765 | 3/1936 | Schmidt | 266/57 |
|---|---|---|---|
| 2,528,147 | 10/1950 | Jesonis | 266/57 |
| 3,300,201 | 1/1967 | Atkinson | 266/57 |
| 3,790,144 | 2/1974 | Waldron | 266/57 |
| 4,052,039 | 10/1977 | Koyano et al. | 266/57 |
| 4,148,467 | 4/1979 | Sargeant | 266/57 |

Primary Examiner—W. Stallard
Attorney, Agent, or Firm—Edward J. Brosius; Fred P. Kostka; Tony T. Shu

[57] ABSTRACT

Helical coil springs for use in such active load supporting functions as railway car trucks, require end forming such that tapered ends are provided which fit flat against the surfaces to be resiliently supported. A process and an apparatus for forming such spring ends by flame cutting is provided.

1 Claim, 2 Drawing Figures

U.S. Patent  Apr. 10, 1984  4,441,696
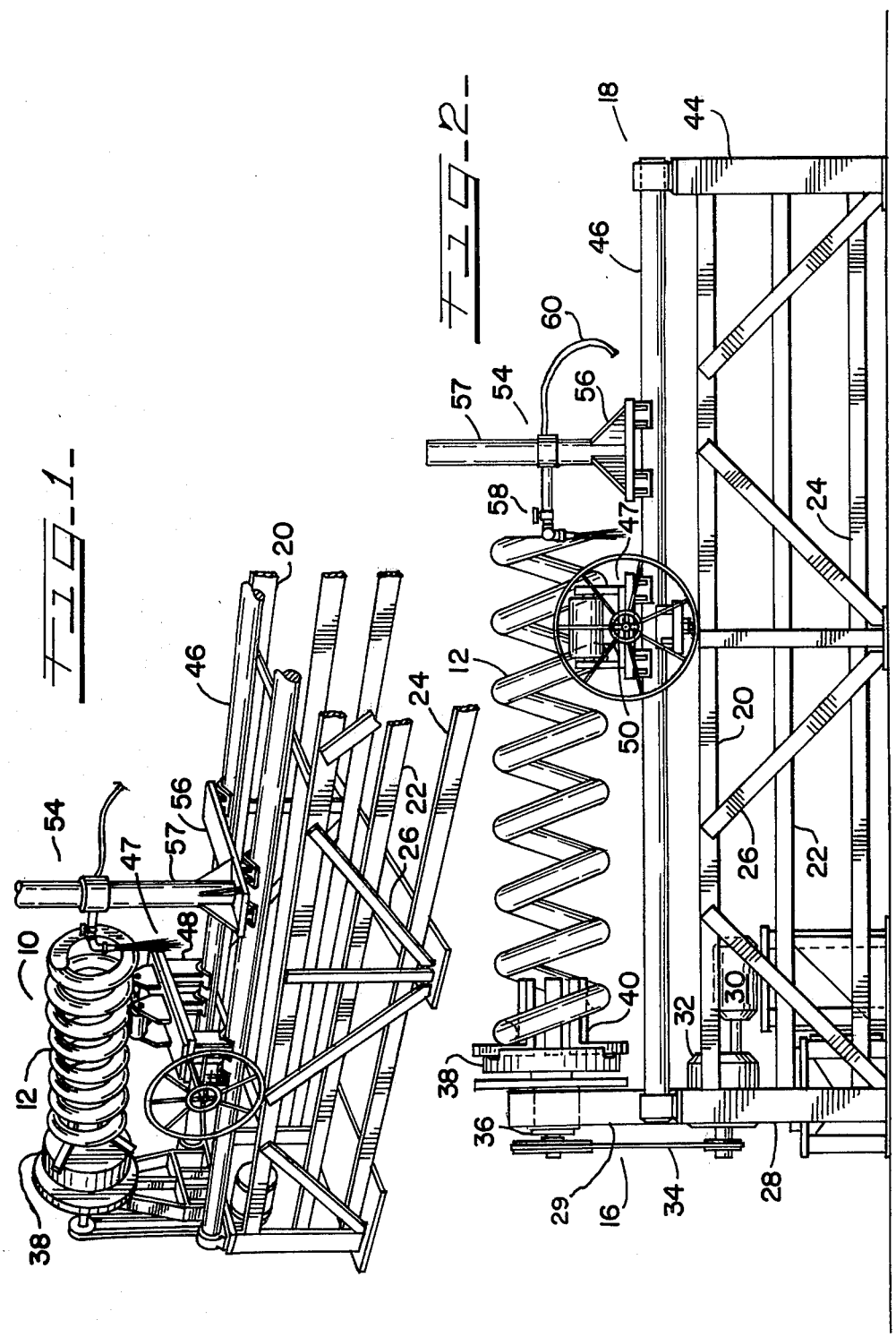

HELICAL COIL SPRING END FORMING

BACKGROUND OF THE INVENTION

The present application is a continuation in part of U.S. Ser. No. 100,017, filed Dec. 3, 1979, and now abandoned.

The present invention relates to the forming of helical coil springs, and more particularly, to the forming of tapered ends in such coiled springs by flame cutting.

In known methods of coil spring production, round, square or rectangular bar sections are coiled to form a spring. When the bar diameter exceeds 0.62 in (1.57 cm), the springs are almost exclusively hot coiled. This hot coiling process is well known in the art, and need not be further described. After hot coiling, the spring is typically either direct quenched, or double heat treated, wherein the spring is cooled below critical temperature, reheated, and then quenched. After quenching, the springs are tempered to the desired hardness.

Such springs after tempering and presetting are then typically shot peened to increase the fatigue strength of the springs, and accordingly reduce the requisite spring size and cost. This shot peening is a cold working operation and is used to reduce the effect of surface defects and to introduce residual compressive stresses that react against load stresses. Prior to shot peening, the springs are typically preset through a process involving compression to produce a premanent set in the spring.

The ends of the spring can be taper rolled prior to coiling to form blunt ends which are tapered from the full diameter to approximately one-third of the bar diameter. This requires specialized rolling equipment which must be carefully monitored to insure squareness of the ends with the coil centerline. Or the coil spring ends may be ground to a blunt or flat end surface. This operation requires considerable labor time. Further it is desirable to eliminate, if possible, such an extensive grinding operation as part of the overall attempt at lessening noise in the manufacturing location.

Accordingly, it is an object of the present invention to provide a simple and accurate method of forming flat ends on a coiled spring.

SUMMARY OF THE INVENTION

The present invention provides a method and an apparatus for forming flat ends on coiled springs. The method involves the flame cutting of the coiled spring whereby the end thereby cut is simply and accurately formed into a flat surface, allowing the desired planar contact between the spring and the contacting member.

The present invention also provides a flame cutting device for cutting the end of a coil spring including:

a base table structure having front and rear vertical support posts, horizontal members joining said front and rear vertical support posts, crosswise members supporting said hroizontal members, and at least two guide members affixed to said front and rear vertical support posts, a rotating mechanism affixed to said front vertical support post, said rotating mechanism comprising driving means and connection means, said connection means being adapted to hold a coil spring at one end thereof and said connection means being adjustable in height to accommodate different sized coil springs, roller means located on said guide members adapted to support the coil spring, flame cutting means comprising a support column affixed to said guide members in a manner such that said support column can be moved along said guide members, and a flame cutting torch affixed to said support column in a manner such that said flame cutting torch can be moved up and down along said support column, said flame cutting torch extending into the interior central section of the coil spring being cut, wherein by the rotation of said rotating mechanism and connection means, the coil spring held in said connection means can be cut at its other end by said flame cutting torch to form a flat surface on said end.

It is known that flame cutting of most metals used in the manufacture of coil springs results in the production of a brittle, hardened martensitic area adjacent to the cut surface. The present invention avoids the production of such martensitic area by performing the flame cutting operation after the heat treating operation while the spring is at temperatures above that at which martensite forms. Commonly, the cutting operation will be performed on springs which are at a temperature of 600°–800° F. (315°–425° C.), with reasonable allowance for differing spring materials.

BRIEF DESCRIPTION OF THE DRAWINGS

In the drawings,

FIG. 1 is a perspective view of the flame cutting device in operation,

FIG. 2 is a side elevational view of the flame cutting device.

DESCRIPTION OF THE PREFERRED EMBODIMENT

FIGS. 1 and 2 show an overall embodiment of the present invention. The flame cutting device is shown generally at 10. A coil spring 12 being cut is shown to be retained in the cutting device.

Cutting device 10 comprises a base portion, a head portion 16 and end portion 18. Said base portion is generally comprised of a pair of upper support members 20, center support members 22 and lower support members 24. Several cross members 26 join the upper, center and lower support members.

Head portion 16 of cutting device 10 comprises a vertical front support post 28. A rotating driver such as electric motor 30 is provided. The drive shaft from electric motor 30 is connected to a gear reduction means 32, which acts to increase the torque of the motor output. The output shaft of gear reduction means 32 is in turn attached to drive belt 34, which acts to turn coil rotating mechanism 36. Coil rotating mechanism 36 is mounted in a housing on the top of vertical support post 28.

Coil rotating mechanism 36 includes coil support means which is comprised of base plate 38 slidably affixed to a housing 29 on the top of front support post 28 and support arms 40. The slidable affixation of base plate 38 to housing 29 permits the cutting device 10 to accommodate springs of various diameters. Support arms 40 extend within coil 12 and hold and also rotate the coil.

End portion 18 of cutting device 10 includes rear support post 44.

Two tubular support rails 46 are provided which are supported in and extend from front support post 28 to rear support post 44. Central coil support 47 is supported on and is slidable along support rails 46. Coil support 47 includes a base portion 48 and two rollers 50.

Base portion 48 can be slid along support rails 46 to accommodate different length coils. Rollers 50 are rotatable inside base 48, and support coil spring 12 by permitting the rotation of coil spring 12 thereon.

Finally, cutting torch mechanism 54 is provided. This device comprises a base portion 56 which is supported on and slidable along support rails 46 to accommodate different lengths of coil springs. Torch support column 57 is supported in base 56. Cutting torch 58 is supported on and vertically slidable along torch support collumn 57 to accommodate various diameters of coil springs. Gas line 60 is attached to cutting torch 58 and to a suitable supply of cutting torch gas (not shown).

In the operation of the cutting torch device, a spring 12 is placed in coil support arms 40 and on support rollers 50. Cutting torch 58 is adjusted to the appropriate height on torch support column 57, and to the desired spring length along support rails 46. The spring rotating driver is started, and cutting torch 58 is lit; as coil 12 slowly rotates, a flat surface is cut on the one end of coil 12. Coil 12 is still at an elevated temperature from heat treatment when placed on the flame cutting device. The flat end surface formed on coil 12 can frequently be used as is or after shot peening, with very little finish grinding, if any, required.

It will be understood that a preferred embodiment of the present invention has been described, and that the scope of this invention is to be set forth in the following claims.

What is claimed is:

1. A flame cutting device for cutting the end of a coil spring including:
   a base table structure having front and rear vertical support posts, horizontal members joining said front and rear vertical support posts, crosswise members supporting said horizontal members, and at least two guide members affixed to said front and rear vertical support posts,
   a rotating mechanism affixed to said front vertical support post, said rotating mechanism comprising driving means and connection means, said connection means being adapted to hold a coil spring at one end thereof and said connection means being adjustable in height to accommodate different sized coil springs,
   roller means located on said guide members adapted to support the coil spring,
   flame cutting means comprising a support column affixed to said guide members in a manner that said support column can be moved along said guide members, and a flame cutting torch affixed to said support column in a manner such that said flame cutting torch can be moved up and down along said support column, said flame cutting torch extending into the interior central section of the coil spring being cut,
   wherein by the rotation of said rotating mechanism and connection means, the coil spring held in said connection means can be cut at its other end by said flame cutting torch to form a flat surface on said end.

* * * * *